(12) United States Patent
Ohmori et al.

(10) Patent No.: US 11,387,467 B2
(45) Date of Patent: Jul. 12, 2022

(54) FUEL CELL SEPARATOR MEMBER AND FUEL CELL STACK

(71) Applicant: HONDA MOTOR CO., LTD., Tokyo (JP)

(72) Inventors: Suguru Ohmori, Wako (JP); Takuro Okubo, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 198 days.

(21) Appl. No.: 17/014,213

(22) Filed: Sep. 8, 2020

(65) Prior Publication Data

US 2021/0075029 A1 Mar. 11, 2021

(30) Foreign Application Priority Data

Sep. 10, 2019 (JP) .............................. JP2019-164322

(51) Int. Cl.
*H01M 8/0206* (2016.01)
*H01M 8/2465* (2016.01)
*H01M 8/0247* (2016.01)

(52) U.S. Cl.
CPC ....... *H01M 8/0206* (2013.01); *H01M 8/0247* (2013.01); *H01M 8/2465* (2013.01)

(58) Field of Classification Search
None
See application file for complete search history.

(56) References Cited

U.S. PATENT DOCUMENTS

| 10,629,937 | B2 | 4/2020 | Ohmori et al. | |
|---|---|---|---|---|
| 10,916,792 | B2 | 2/2021 | Ohmori et al. | |
| 2012/0107713 | A1* | 5/2012 | Miller | H01M 8/0273 429/457 |
| 2016/0072145 | A1 | 3/2016 | Martinchek et al. | |
| 2017/0324099 | A1 | 11/2017 | Stoehr et al. | |
| 2019/0319280 | A1* | 10/2019 | Ohmori | H01M 8/2404 |
| 2019/0341631 | A1* | 11/2019 | Haase | H01M 8/0276 |

FOREIGN PATENT DOCUMENTS

| CN | 109119654 A | 1/2019 |
|---|---|---|
| JP | 2014-093212 A | 5/2014 |
| JP | 2017-537433 A | 12/2017 |
| JP | 2019-003830 A | 1/2019 |
| JP | 2019-003831 A | 1/2019 |

* cited by examiner

*Primary Examiner* — Alix E Eggerding
(74) *Attorney, Agent, or Firm* — Carrier Blackman & Associates, P.C.; Joseph P. Carrier; William D. Blackman (57) ABSTRACT

In a fuel cell separator member of a fuel cell stack, a first metal bead and first ribs are formed integrally with and protruded from a surface of the first metal separator. Each of the first ribs includes a first rib body and two first retracted portions. The protruding height of each of the two first retracted portions is smaller than the protruding height of the first rib body.

18 Claims, 6 Drawing Sheets

FUEL CELL SEPARATOR MEMBER AND FUEL CELL STACK

CROSS-REFERENCE TO RELATED APPLICATION

This application is based upon and claims the benefit of priority from Japanese Patent Application No. 2019-164322 filed on Sep. 10, 2019, the contents of which are incorporated herein by reference.

BACKGROUND OF THE INVENTION

Field of the Invention

The present invention relates to a fuel cell separator member and a fuel cell stack.

Description of the Related Art

Normally, a fuel cell stack is formed by stacking a plurality of power generation cells in a stacking direction, and applying a load to the power generation cells for tightening the power generation cells. Each of the power generation cells includes a MEA (membrane electrode assembly) and a pair of metal separators sandwiching the MEA. For example, a metal bead is formed around an outer peripheral portion of the metal separator. The metal bead protrudes from, and is formed integrally with a metal separator, for preventing leakage of a reactant gas, from a position between the MEA and the metal separator.

In the state where the tightening load in the stacking direction is applied to the fuel cell stack, the metal bead is deformed elastically (deformed by compression), and pressed to a resin frame provided in an outer peripheral portion of the MEA. Therefore, a predetermined surface pressure is applied to the metal bead.

According to the disclosure of the specification of U.S. Patent Application Publication No. 2016/0072145, a fuel cell stack includes a power generation cell including a load receiver protruding outward from an outer peripheral portion of the metal separator. In the fuel cell stack, when an impact load is applied to the fuel cell stack from the outside, the load receiver contacts a protruding portion protruding inward from an internal surface of a stack case.

As a result, movement of the power generation cells in a direction perpendicular to the stacking direction of the power generation cells is suppressed.

SUMMARY OF THE INVENTION

In this regard, in order to increase the rigidity of a portion of the metal separator supporting the load receiver, a rib may be formed integrally with and protruded from the metal separator in a manner that the rib extends in a line pattern along the metal bead between the load receiver and the metal bead. In this case, when a tightening load is applied to the fuel cell stack in the stacking direction, the protruding end surface of the rib contacts a metal separator (opposite side metal separator) which is positioned on the side opposite to the metal separator through the MEA.

However, the ends of the rib extending in the direction in which the rib extends have relatively high rigidity, and thus, cannot be warped easily. Therefore, a load for tightening the fuel cell stack is applied to the ends of the rib undesirably. As a result, the surface pressure applied to the portions of the metal bead adjacent to the ends of the metal bead in the direction in which the rib extends may become relatively small (the surface pressure is released). Therefore, the surface pressure applied to the metal bead may become uneven.

The present invention has been made taking the problem into account, and an object of the present invention is to provide a fuel cell separator member and a fuel cell stack in which it is possible to improve the rigidity of a portion of the metal separator supporting a load receiver, and reduce variation of the surface pressure applied to the metal bead of the metal separator.

According to an aspect of the present invention, a fuel cell separator member is provided. The fuel cell separator member includes a metal separator forming a power generation cell of a fuel cell stack, and a load receiver provided for the metal separator in a manner that the load receiver protrudes outward from an outer peripheral portion of the metal separator. A metal bead and a rib are formed integrally with and protruded from one surface of the metal separator. The metal bead extends along the outer peripheral portion of the metal separator and is configured to prevent leakage of a reactant gas through a position between a membrane electrode assembly and the metal separator. The rib extends in a line pattern along the metal bead between the load receiver and the metal bead. The rib includes a rib body positioned at a central portion of the rib in a direction in which the rib extends, and two retracted portions positioned at both ends of the rib in the direction in which the rib extends. The protruding height of each of the two retracted portions is smaller than the protruding height of the rib body.

According to another aspect of the present invention, a fuel cell stack is provided. The fuel cell stack includes power generation cells each including the fuel cell separator member as described above. A load in a stacking direction of the power generation cells is applied to the fuel cell stack in a state where a plurality of the power generation cells are stacked together.

In the present invention, since the rib is formed to protrude from the metal separator, between the load receiver and the metal bead, improvement in the rigidity of the portion of the metal separator supporting the load receiver is achieved.

Further, the protruding height of each of the retracted portions is smaller than the protruding height of the rib body. Therefore, when the fuel cell separator member is incorporated into the fuel cell stack, and the tightening load is applied to the fuel cell stack in the stacking direction, it is possible to reduce the tightening load applied to both ends of the rib, (or it is possible to prevent the tightening load from being applied to both ends of the rib). Thus, it is possible to suppress decrease of the surface pressure applied to the portion of the metal bead adjacent to the ends of the rib in the direction in which the rib extends. Accordingly, it is possible to reduce variation of the surface pressure applied to the metal bead of the metal separator.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Hereinafter, a preferred embodiment of a fuel cell separator member and a fuel cell stack according to the present invention will be described with reference to the accompanying drawings.

Figure 1:
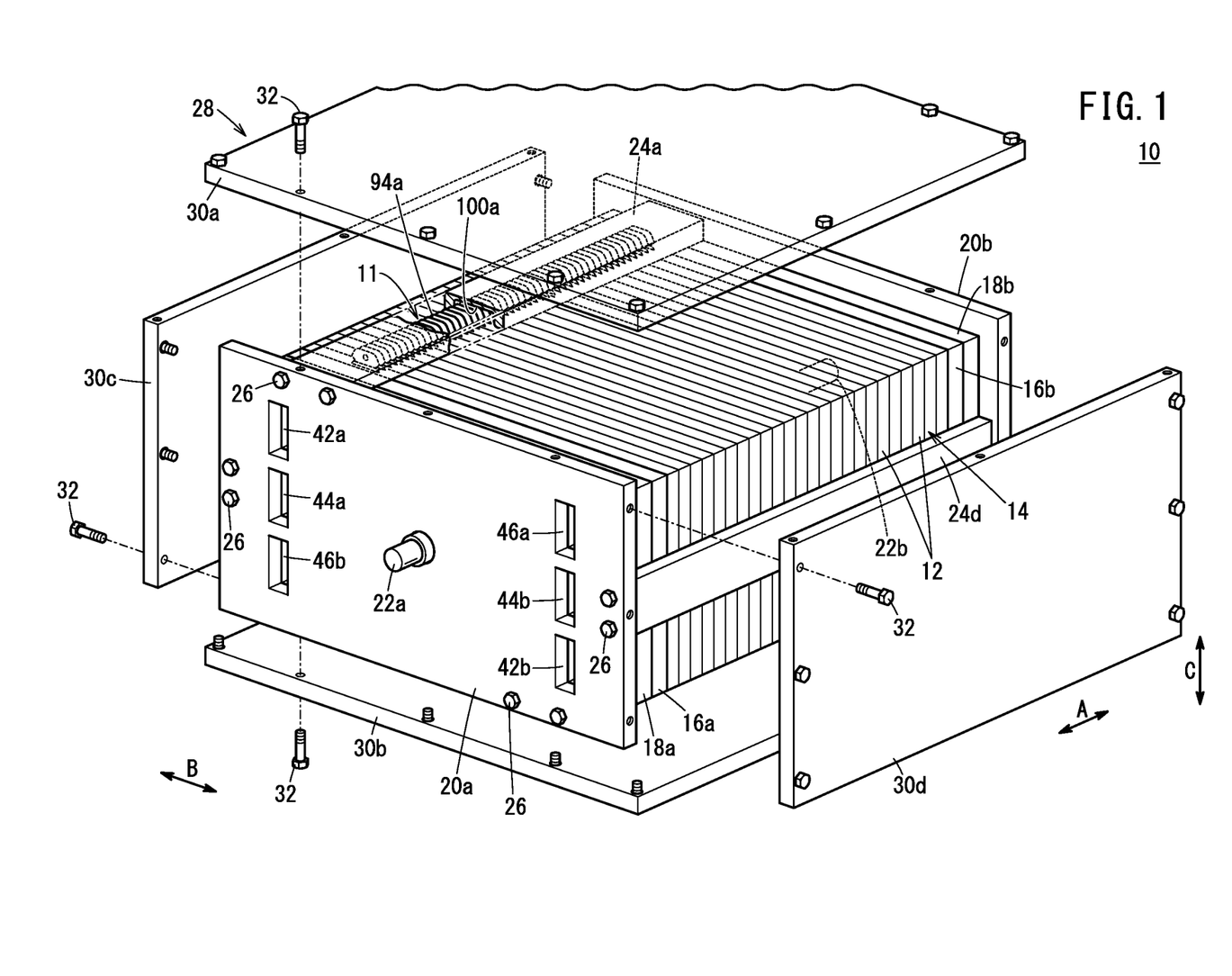
FIG. 1 is a partial exploded perspective view showing a fuel cell including a fuel cell separator member according to an embodiment of the present invention.

As shown in FIG. 1, a fuel cell stack 10 according to the embodiment of the present invention includes a stack body 14 formed by stacking a plurality of power generation cells 12 together. For example, the fuel cell stack 10 is formed by stacking a plurality of power generation cells 12 in a stacking direction (indicated by an arrow A), and mounted in a fuel cell automobile in a manner that the stacking direction of the power generation cells 12 is oriented in a horizontal direction (a vehicle width direction or a vehicle length direction). The fuel cell stack 10 may be mounted in a fuel cell automobile in a manner that the stacking direction of the power generation cells 12 is oriented in the vertical direction (vehicle height direction) of the fuel cell automobile.

At one end of the stack body 14 in a stacking direction (in the direction indicated by the arrow A), a terminal plate 16a is provided. An insulator 18a is provided outside the terminal plate 16a, and an end plate 20a is provided outside the insulator 18a. At the other end of the stack body 14 in the stacking direction, a terminal plate 16b is provided. An insulator 18b is provided outside terminal plate 16b, and an end plate 20b is provided outside the insulator 18b.

An output terminal 22a is electrically connected to the terminal plate 16a. An output terminal 22b is electrically connected to the terminal plate 16b. Each of the insulators 18a, 18b is an electrically insulating plate.

Figure 2:
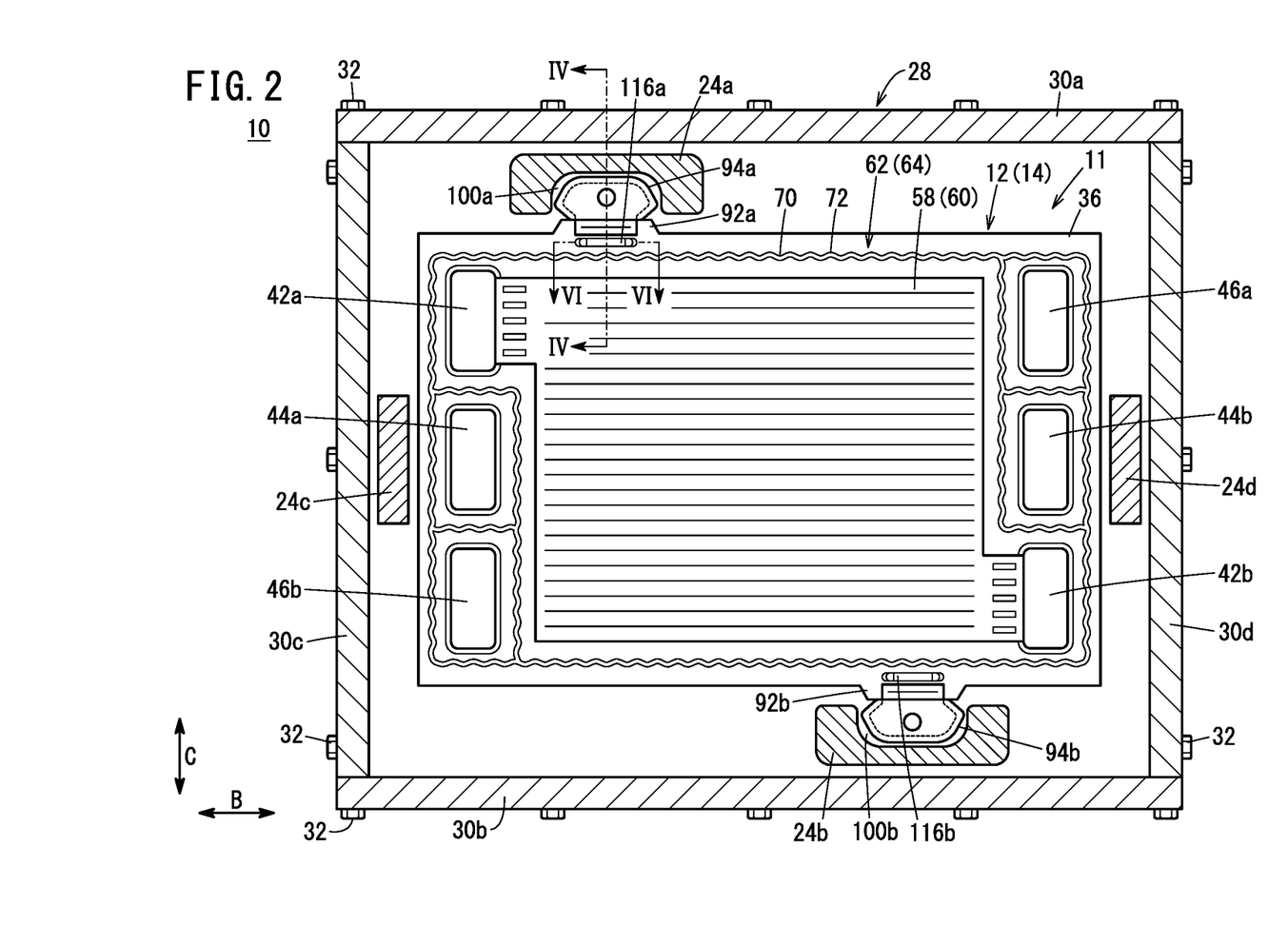
FIG. 2 is a schematic lateral cross sectional view showing a fuel cell stack in FIG. 1.

Each of the end plates 20a, 20b has a laterally elongated rectangular shape. As shown in FIGS. 1 and 2, coupling members 24a to 24d (coupling bars) are disposed between the sides of the end plates 20a, 20b. Both ends of each of the coupling members 24a to 24d is fixed to internal surfaces of the end plates 20a, 20b using bolts 26 (see FIG. 1). In this manner, the coupling members 24a to 24d apply a tightening load in the stacking direction (indicted by the arrow A) to the fuel cell stack 10 (stack body 14).

The coupling member 24a is shifted from the center toward one end of one of the long sides of the end plates 20a, 20b. The coupling member 24b is shifted from the center toward the other end of the other of the long sides of the end plates 20a, 20b. The coupling members 24c, 24d are positioned at the center of each of the respective short sides of the end plates 20a, 20b.

The fuel cell stack 10 includes a cover 28 which covers the stack body 14 in a direction perpendicular to the stacking direction. The cover 28 includes a pair of side panels 30a, 30b having a laterally elongated plate shape forming two surfaces at both ends of the end plates 20a, 20b in the lateral direction (in the direction indicated by the arrow C), and a pair of side panels 30c, 30d having a laterally elongated shape forming two surfaces at both ends of the end plates 20a, 20b in the longitudinal direction (in the direction indicated by the arrow B). Each of the side panels 30a to 30d is fixed to side surfaces of the end plates 20a, 20b using bolts 32. The cover 28 may be used as necessary. The cover 28 may be dispensed with. The cover 28 may be produced by forming the side panels 30a to 30d integrally to have a cylindrical shape by casting or extrusion.

Figure 3:
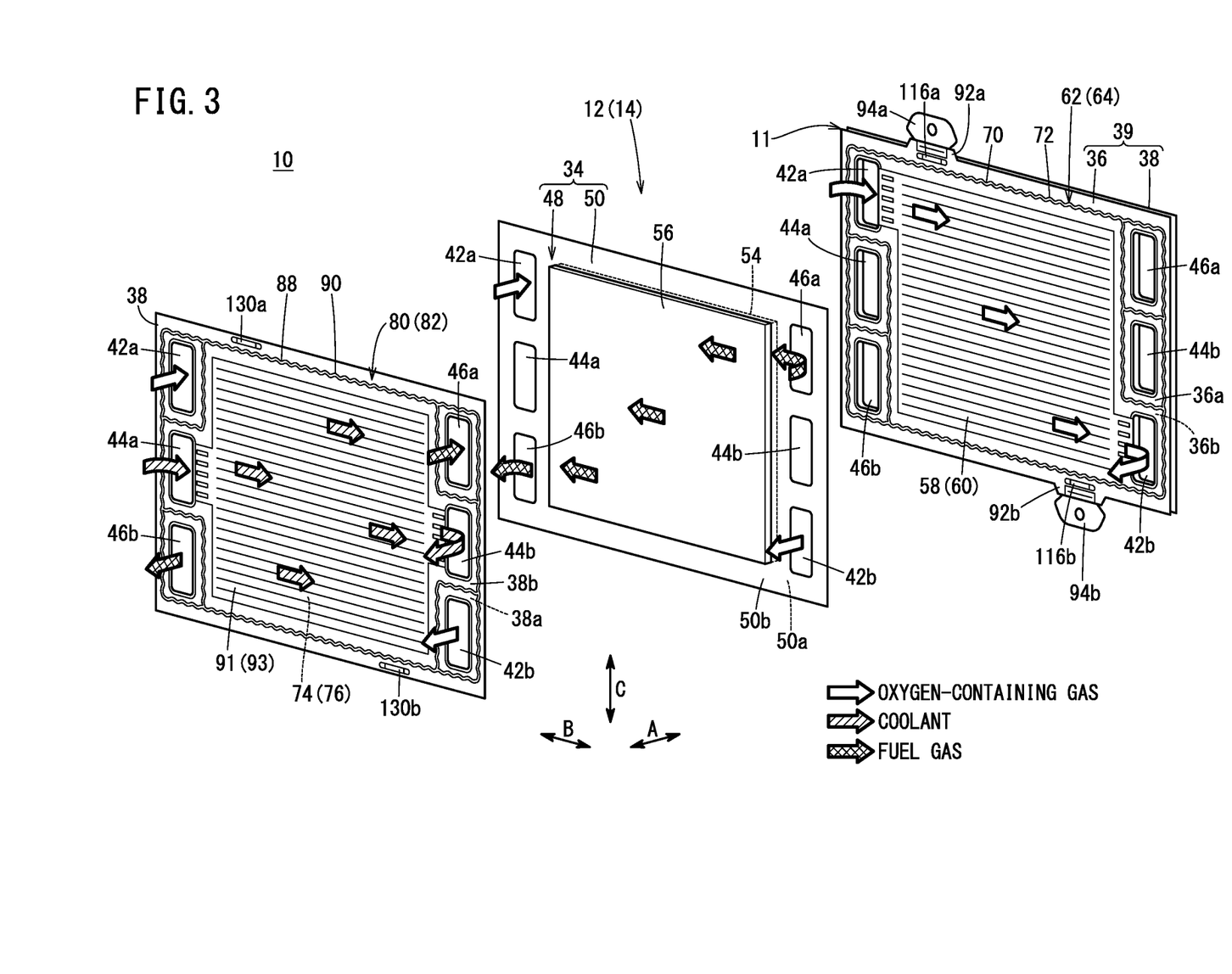
FIG. 3 is an exploded perspective view showing main components of a power generation cell of the fuel cell stack in FIG. 1.

As shown in FIG. 3, the power generation cell 12 includes a resin frame equipped MEA 34, a fuel cell separator member 11 having a first metal separator 36, and a second metal separator 38 (opposite side metal separator) positioned on the side opposite to the first metal separator 36 through the resin frame equipped MEA 34.

At one end of the power generation cell 12 in the long side direction indicated by the arrow B, an oxygen-containing gas supply passage 42a, a coolant supply passage 44a, and a fuel gas discharge passage 46b are arranged in the direction indicated by the arrow C. The oxygen-containing gas supply passage 42a of the power generation cells 12 extend through the plurality of power generation cells 12 in the stacking direction (indicated by the arrow A), for supplying, e.g., an oxygen-containing gas. The coolant supply passage 44a formed in each of the power generation cells 12 extends through the power generation cells 12 in the direction indicated by the arrow A, for supplying pure water, ethylene glycol, oil, etc. The fuel gas discharge passage 46b formed in each of the power generation cells 12 extends through the power generation cells 12 in the direction indicated by the arrow A, for discharging the fuel gas such as a hydrogen-containing gas.

At the other end of the power generation cells 12 in the direction indicated by the arrow B, a fuel gas supply passage 46a, a coolant discharge passage 44b, and an oxygen-containing gas discharge passage 42b are arranged in the direction indicated by the arrow C. The fuel gas supply passage 46a extends through each of the power generation cells 12 in the direction indicated by the arrow A, for supplying the fuel gas. The coolant discharge passage 44b extends through each of the power generation cells 12 in the direction indicated by the arrow A for discharging the coolant discharge passage 44b. The oxygen-containing gas discharge passage 42b extends through each of the power generation cells 12 in the direction indicated by the arrow A, for discharging the oxygen-containing gas.

It should be noted that each of the oxygen-containing gas supply passage 42a, the oxygen-containing gas discharge passage 42b, the fuel gas supply passage 46a, the fuel gas discharge passage 46b, the coolant supply passage 44a, and the coolant discharge passage 44b is also formed in the end plate 20a (see FIG. 1).

The sizes, the positions, the shapes, and the numbers of the oxygen-containing gas supply passage 42a, the oxygen-containing gas discharge passage 42b, the fuel gas supply passage 46a, the fuel gas discharge passage 46b, the coolant supply passage 44a, and the coolant discharge passage 44b are not limited to the present embodiment, and may be determined as necessary depending on the required specification.

Figure 4:
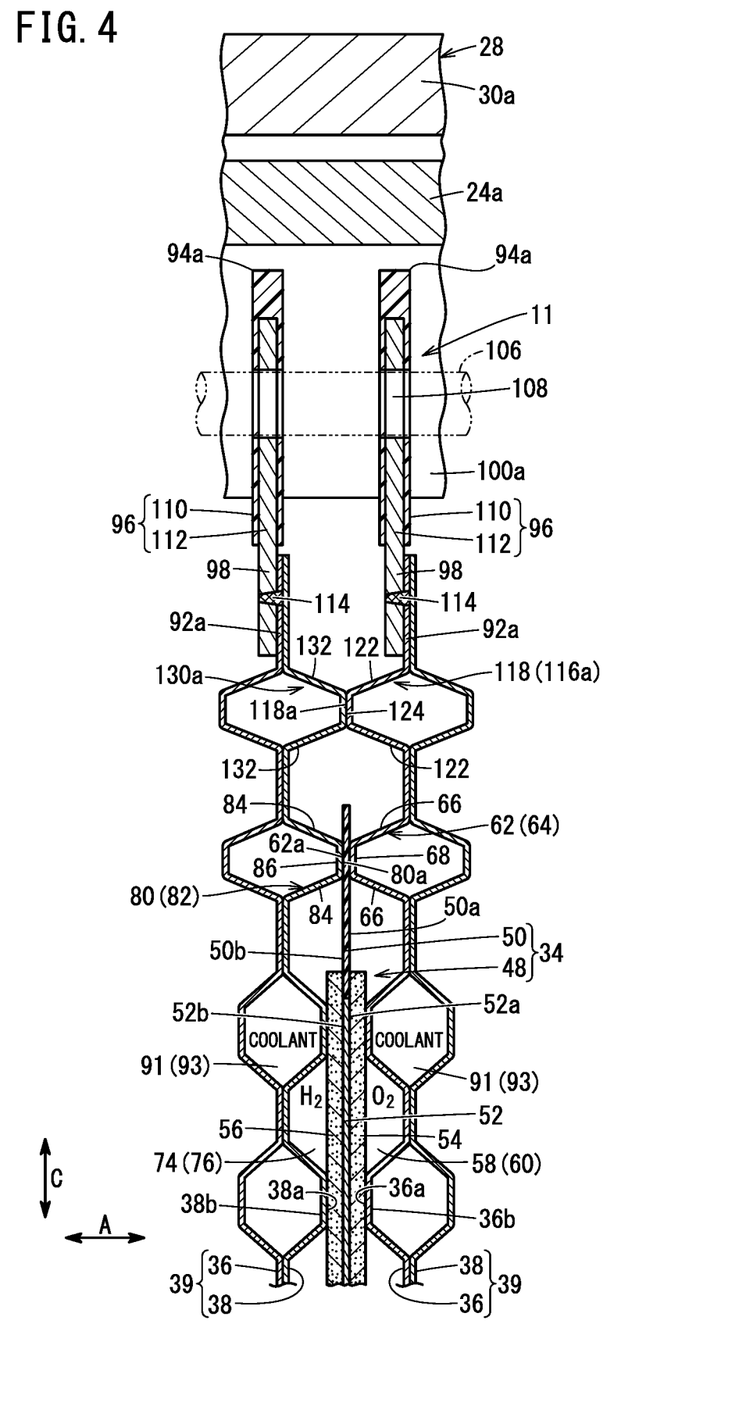
FIG. 4 is a cross sectional view with partial omission, taken along a line IV-IV in FIG. 2.

In FIGS. 3 and 4, the resin frame equipped MEA 34 includes a membrane electrode assembly (hereinafter referred to as the "MEA 48"), and a resin frame member 50 (resin frame portion, resin film) formed around an outer peripheral portion of the MEA 48. The resin frame member 50 has an overlap portion which is overlapped with an outer peripheral portion of the MEA 48 in a manner that the MEA 48 and the resin frame member 50 are joined together. The MEA 48 includes an electrolyte membrane 52, a cathode 54 provided on one surface 52a of the electrolyte membrane 52, and an anode 56 provided on the other surface 52b of the electrolyte membrane 52.

For example, the electrolyte membrane 52 is a solid polymer electrolyte membrane (cation ion exchange membrane). For example, the sold polymer electrolyte membrane is a thin membrane of perfluorosulfonic acid containing water. A fluorine based electrolyte may be used as the electrolyte membrane 52. Alternatively, an HC (hydrocarbon) based electrolyte may be used as the electrolyte membrane 52. The electrolyte membrane 52 is sandwiched between the cathode 54 and the anode 56.

Though not shown in details, the cathode 54 includes a first electrode catalyst layer joined to one surface 52a of the electrolyte membrane 52, and a first gas diffusion layer stacked on the first electrode catalyst layer. The first electrode catalyst layer is formed by depositing porous carbon particles uniformly on the surface of the first gas diffusion layer, and platinum alloy is supported on surfaces of the carbon particles. The anode 56 includes a second electrode catalyst layer joined to the other surface 52b of the electrolyte membrane 52, and a second gas diffusion layer stacked on the second electrode catalyst layer. The second electrode catalyst layer is formed by depositing porous carbon particles uniformly on the surface of the second gas diffusion layer, and platinum alloy is supported on surfaces of the carbon particles. Each of the first gas diffusion layer and the second gas diffusion layer comprises a carbon paper, a carbon cloth, etc.

The surface size of the electrolyte membrane 52 is smaller than the surface sizes of the cathode 54 and the anode 56. The outer marginal portion of the cathode 54 and the outer marginal portion of the anode 56 hold the inner marginal portion of the resin frame member 50. The resin frame member 50 has non-impermeable structure where the reactant gases (the oxygen-containing gas and the fuel gas) do not pass through the resin frame member 50. The resin frame member 50 is provided on the outer peripheral side of the MEA 48.

The resin frame equipped MEA 34 may not use the resin frame member 50, and may use the electrolyte membrane 52 which protrude outward. Further, the resin frame equipped MEA 34 may be formed by providing frame shaped films on both sides of the electrolyte membrane 52.

In FIG. 3, each of the first metal separator 36 and the second metal separator 38 has a rectangular (quadrangular shape). Each of the first metal separator 36 and the second metal separator 38 is formed by press forming of a metal thin plate to have a corrugated shape in cross section and a wavy shape on the surface. For example, the metal plate is a steel plate, a stainless steel plate, an aluminum plate, a plated steel plate, or a metal plate having an anti-corrosive surface by surface treatment. The first and second metal separators 36, 38 may be made of carbon material. In the state where the first metal separator 36 and the second metal separator 38 are overlapped with each other, outer ends of first metal separator 36 and the second metal separator 38 are joined together by welding, brazing, crimping, etc. integrally to form a one piece joint separator 39.

As shown in FIGS. 3 and 4, the first metal separator 36 has an oxygen-containing gas flow field 58 on its surface 36a facing the MEA 48. The oxygen-containing gas flow field 58 is connected to the oxygen-containing gas supply passage 42a and the oxygen-containing gas discharge passage 42b. The oxygen-containing gas flow field 58 includes a plurality of oxygen-containing gas flow grooves 60 extending straight in the direction indicated by the arrow B. Each of the oxygen-containing gas flow grooves 60 may extend in the direction indicated by the arrow B in a wavy pattern.

A first seal 62 is provided on the first metal separator 36, around the outer peripheral portion of the first metal separator 36, for preventing leakage of the oxygen-containing gas (reactant gas) to the outside from a position between the MEA 48 and the first metal separator 36. The first seal 62 includes a first metal bead 64 formed integrally with the first metal separator 36. The first metal bead 64 protrudes from the first metal separator 36 toward the second metal separator 38 positioned on the side opposite to the first metal separator 36 through the MEA 48.

In FIG. 4, the first metal bead 64 has a trapezoidal shape in lateral cross section which is tapered (narrowed) toward the front end of the first metal bead 64. That is, the first metal bead 64 includes first seal sidewalls 66 on both sides, inclined in the separator thickness direction (thickness direction indicated by the arrow A), and a first seal coupling wall 68 connecting the front ends of these first seal sidewalls 66. The first seal sidewalls 66 are inclined toward the resin frame member 50. The protruding end surface 62a of the first seal 62 (protruding end surface of the first metal bead 64) has a flat surface, and is in surface contact with one surface 50a of the resin frame member 50.

It should be noted that the first seal sidewalls 66 may extend in parallel to the separator thickness direction. That is, the first metal bead 64 may have a rectangular shape in lateral cross section. Further, the protruding end surface 62a of the first seal 62 (protruding end surface of the first metal bead 64) may have a curved surface (R surface) protruding toward the resin frame member 50.

The first seal 62 may be made of resin material having elasticity fixed to the protruding end surface of the first metal bead 64 by printing or coating, etc. For example, polyester fiber may be used as the resin material.

Figure 5A:
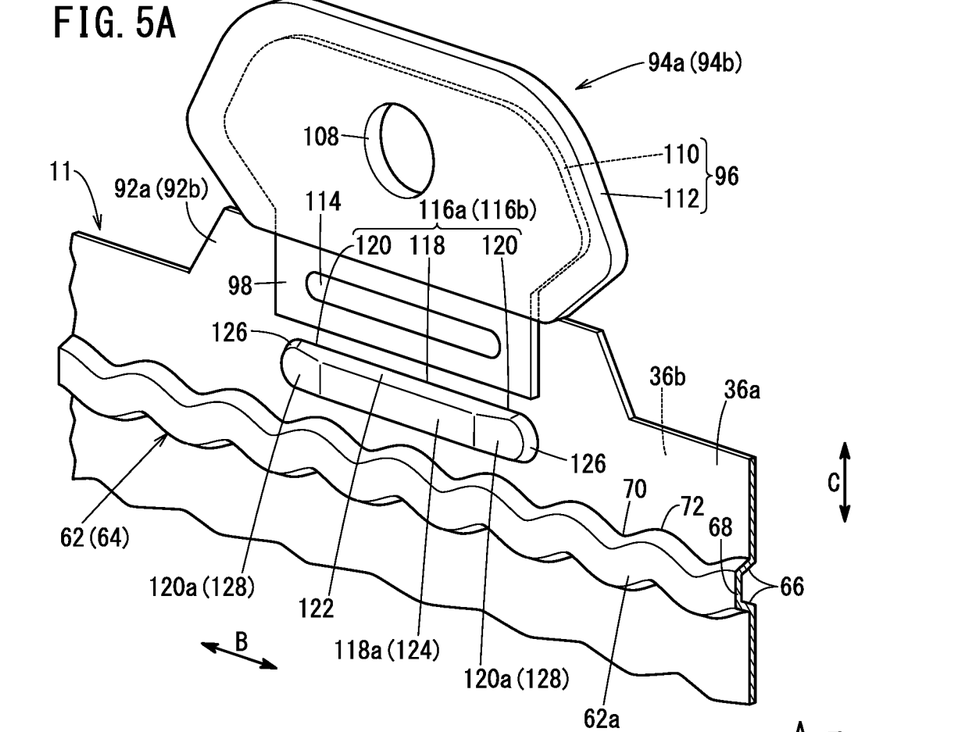
FIG. 5A is a perspective view with partial omission, showing a first rib and a load receiver.

As shown in FIGS. 3 and 5A, the first seal 62 extends in a wavy pattern as viewed in the separator thickness direction. The cycle and the amplitude of the waves of the first seal 62 may be determined as necessary in a manner to achieve the desired sealing characteristics. That is, the first seal 62 has structure where first recessed curves 70 and first protruding curves 72 are arranged alternately. The first recessed curves 70 are recessed away from the outer marginal portion of the first metal separator 36. The first protruding curves 72 are curved to protrude toward the outer marginal portion of the first metal separator 36. The first seal 62 may extend straight.

As shown in FIGS. 3 and 4, the second metal separator 38 has a fuel gas flow field 74 on its surface 38a facing the MEA 48. The fuel gas flow field 74 is connected to the fuel gas supply passage 46a and the fuel gas discharge passage 46b. The fuel gas flow field 74 includes a plurality of fuel gas flow grooves 76 extending in the direction indicated by the arrow B. Each of the fuel gas flow grooves 76 extends in a wavy pattern in the direction indicated by the arrow B.

A second seal 80 is provided on the second metal separator 38, around the outer peripheral portion of the second metal separator 38, for preventing leakage of the fuel gas (reactant gas) to the outside from a position between the MEA 48 and the second metal separator 38. The second seal 80 includes a second metal bead 82 formed integrally with the second metal separator 38. The second metal bead 82 protrudes from the second metal separator 38 toward the first metal separator 36 positioned on the side opposite to the second metal separator 38 through the MEA 34.

In FIG. 4, the second metal bead 82 has a trapezoidal shape in lateral cross section which is tapered (narrowed) toward the front end of the second metal bead 82. That is, the second metal bead 82 includes second seal sidewalls 84 on both sides, inclined in the separator thickness direction, and a second seal coupling wall 86 connecting the ends of these second seal sidewalls 84. The second seal sidewalls 84 are inclined in a direction closer to each other toward the resin frame member 50. The protruding end surface 80a of the second seal 80 (protruding end surface of the second metal bead 82) has a flat surface, and is in surface contact with the other surface 50b of the resin frame member 50.

It should be noted that the second seal walls 84 may extend in parallel in the separator thickness direction. That is, the second metal bead 82 has a rectangular shape in lateral cross section. Further, the protruding end surface 80a of the second seal 80 (protruding end surface of the second metal bead 82) may have a curved surface (R surface) protruding toward the resin frame member 50.

The first seal 62 and the second seal 80 are arranged in a manner that the first seal 62 and the second seal 80 are overlapped with each other in the separator thickness direction (stacking direction). Therefore, in the state where the tightening load is applied to the fuel cell stack 10, each of the first metal bead 64 and the second metal bead 82 is elastically deformed (deformed by compression). Further, in this state, the protruding end surface 62a of the first seal 62 contacts one surface 50a of the resin frame member 50, and the protruding end surface 80a of the second seal 80 contacts the other surface 50b of the resin frame member 50.

The second seal 80 is made of resin material having elasticity fixed to the protruding end surface of the second metal bead 82 by printing, coating, etc. For example, the material is made of polyester fiber.

Figure 5B:
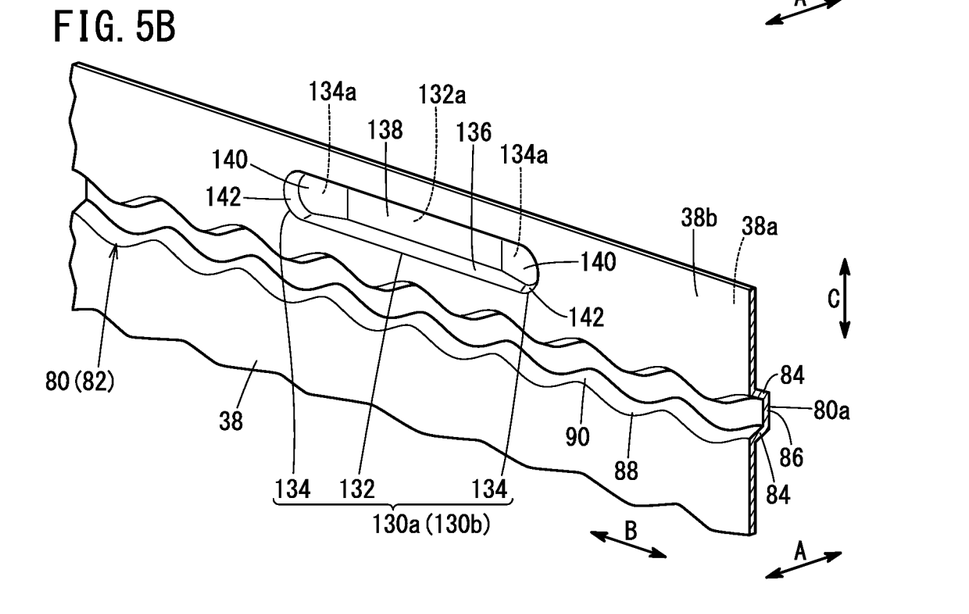
FIG. 5B is a perspective view with partial omission, showing a second rib.

As shown in FIGS. 3 and 5B, the second seal 80 extends in a wavy pattern as viewed in the separator thickness direction. It is adequate that the frequency and the amplitude of the second seal 80 may be determined such that the desired seal characteristics are obtained. That is, the second seal 80 has structure where second recessed curved portions 88 and second protruding curved portions 90 are arranged alternately. The second recessed curved portion 88 is recessed away from an outer marginal portion of the second metal separator 38. The second protruding curved portion 90 is curved toward the outer peripheral portion of the second metal separator 38. The second seal 80 may extend straight.

As shown in FIGS. 3 and 4, a coolant flow field 91 is provided between a surface 36b of a first metal separator 36 and a surface 38b of a second metal separator 38. The coolant flow field 91 is connected to the coolant supply passage 44a and the coolant discharge passage 44b. The coolant flow field 91 includes a plurality of coolant flow grooves 93 extending straight in the direction indicated by the arrow B. The coolant flow field 91 is formed by the back surface of the oxygen-containing gas flow field 58 and the back surface of the fuel gas flow field 74.

As shown in FIGS. 2 to 5A, the fuel cell separator member 11 includes a load receiver 94a provided on a support portion 92a formed on the first metal separator 36 and a load receiver 94b provided on a support portion 92b formed on the first metal separator 36.

As shown in FIGS. 2 and 3, the support portion 92a protrudes outward (in the direction indicated by the arrow C from one long side of the first metal separator 36. The support portion 92a is shifted from the center toward one end of the one long side of the first metal separator 36 in a manner to face the coupling member 24a. The support portion 92a is provided integrally with the first metal separator 36 by press forming. It should be noted that the support portion 92a may be joined to the first metal separator 36. The support portion 92a supports the load receiver 94a. The support portions 92a may not protrude outward from the one long side of the first metal separator 36.

As shown in FIGS. 4 and 5A, the load receiver 94a is a plate member for receiving an external load (impact load) in a direction (indicated by an arrow B) perpendicular to the stacking direction of the power generation cells 12. In FIGS. 4 and 5A, the load receiver 94a includes a protrusion 96 protruding outward in the direction indicated by the arrow C from the support portion 92a, and an attachment portion 98 provided integrally with the protrusion 96, and joined to the support portion 92a.

The protrusion 96 of the load receiver 94a is inserted into a recess 100a formed in the coupling member 24a (see FIG. 2). It should be noted that the coupling member 24a may be formed integrally with the cover 28. The same thing is applicable to the coupling member 24b. In FIG. 4, the positioning hole 108 is formed at the center of the protrusion 96. A rod 106 for positioning each of the power generation cells 12 at the time of producing the fuel cell stack 10 is inserted into the positioning hole 108. It should be noted that the rod 106 may be extracted from the positioning hole 108 after completing positioning of each of the power generation cells 12. The rod 106 may be left in the positioning hole 108.

As shown in FIGS. 4 and 5A, the protrusion 96 includes a base 110 forming the outer shape and an insulting portion 112 covering the outer surface of the base 110. The base 110 and the attachment portion 98 are formed by press forming of one metal plate by press forming. Examples of the materials of the base 110 and the attachment portion 98 include the same material as those of the first metal separator 36 and the second metal separator 38. The insulating portion 112 interrupts electrical connection between the base 110 and the coupling member 24a.

In FIG. 5A, the attachment portion 98 has a substantially rectangular shape, and extends in the direction indicated by the arrow B. The attachment portion 98 is positioned at the center of the support portion 92a in the direction indicated by the arrow B. In the state where the attachment portion 98 and the surface of the support portion 92a (surface 36a of the first metal separator 36) are overlapped with each other, the attachment portion 98 is joined to the support portion 92a by welding, brazing, etc. A joint portion 114 (welding bead) joining the attachment portion 98 and the support portion 92a to each other extends in a longitudinal direction of the attachment portion 98 (the direction indicated by the arrow B).

As shown in FIG. 2, the support portion 92b protrudes outward (in the direction indicated by the arrow C) from the other of the long sides of the first metal separator 36. The support portion 92b is shifted from the center toward the other end of the other of the long sides of the first metal separator 36 in a manner to face the coupling member 24b. The support portion 92b is provided integrally with the first metal separator 36 by press forming. It should be noted that the support portion 92b may be joined to the first metal separator 36. The support portion 92b supports the load receiver 94b. The support portion 92b may not protrude outward from the other of the long sides of the first metal separator 36.

In FIGS. 2, 3, and 5A, the load receiver 94b is a plate member for receiving an external load (impact load) in a direction perpendicular to the stacking direction (indicated by an arrow B) of the power generation cells 12. The load receiver 94b has the same structure as the above described load receiver 94a. Stated otherwise, the load receiver 94b has a shape formed by inverting the load receiver 94a upside down. Therefore, the detailed description regarding structure of the load receiver 94b will be omitted. It should be noted that the protrusion 96 of the load receiver 94b is inserted into a recess 100b formed in the coupling member 24b (see FIG. 2).

As shown in FIGS. 2 to 5A, first ribs 116a, 116b protrude from and are formed integrally with the surface 36a (one surface) of the first metal separator 36. The first ribs 116a, 116b protrude toward the second metal separator 38 positioned on the side opposite to the first metal separator 36 through the MEA 48. That is, the first ribs 116a, 116b protrude in the direction in which the first metal bead 64 protrudes. In the following direction, the second metal separator 38 positioned on the side opposite of the first metal separator 38 facing the first metal separator 36 through the MEA 48 may be referred as the "opposite side second metal separator 38".

In FIG. 5A, the first rib 116a is provided at a position of the first metal separator 36 between the first seal 62 and the load receiver 94a. Stated otherwise, the first rib 116a is provided on the support portion 92a. The first rib 116a is spaced from each of the first seal 62 and the load receiver 94a. The first rib 116a extends straight in a direction in which the first seal 62 extends (indicated by the arrow B). It should be noted that the first rib 116a may extend in a wavy shape. The first rib 116a extends along the attachment portion 98 of the load receiver 94a in the direction indicated by the arrow B by the length which is substantially the same as the length of the attachment portion 98. The width of the first rib 116a is constant over the entire length of the first rib 116a.

As shown in FIGS. 4 and 5A, the first rib 116a includes a first rib body 118 positioned at a central position in a direction in which the first rib 116a extends, and two first retracted portions 120 positioned at both ends of the first rib 116a. The first rib body 118 has a trapezoidal shape tapered toward a direction in which the first rib 116a protrudes.

That is, the first rib body 118 includes first central sidewalls 122 provided at both ends inclined from the separator thickness direction, and a first central top portion 124 connecting the protruding ends of the first central sidewalls 122. Each of the first central sidewalls 122 is inclined in a direction getting closer to each other toward the opposite side second metal separator 38. The top surface of the first rib body 118 (first central top surface 118a) is a flat surface.

Figure 6:
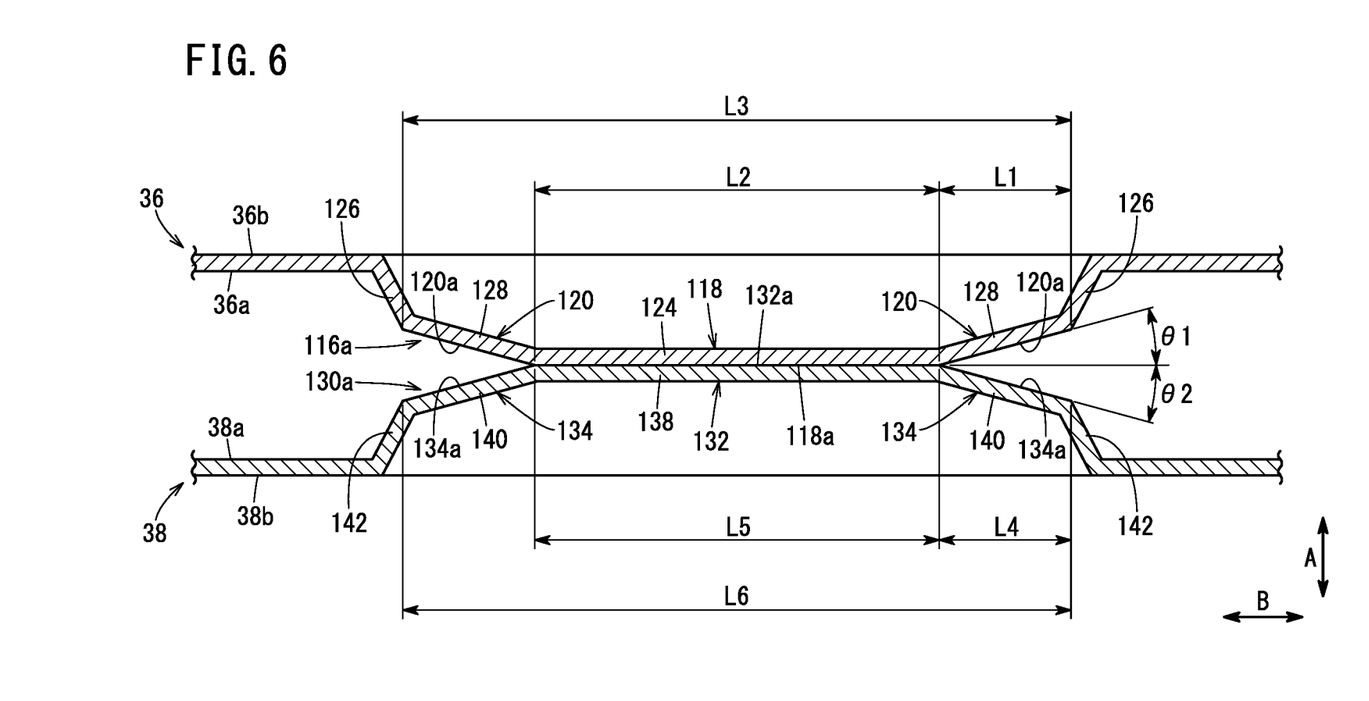
FIG. 6 is a cross sectional view taken along a line VI-VI in FIG. 2.

As shown in FIGS. 5A and 6, the two first retracted portions 120 are coupled to both ends of the first rib body 118. Each of the first retracted portions 120 includes a first end sidewall 126 connecting ends of the first central sidewalls 122 on both sides in the direction indicated by the arrow B together, and first side top portions 128 coupling the first central top portion 124 and the first end sidewall 126 together. The first central top portion 124 and the first side top portion 128 are smoothly connected together.

The first end sidewall 126 is formed to protrude in a circular arc shape outward in the direction in which the first rib 116a extends. The top surface (first retracted surface 120a) of each of the first retracted portions 120 is inclined toward the root of the first rib 116a, and toward the farthest end of the first rib 116a in the direction in which the first rib 116a extends. Specifically, each of the first retracted surfaces 120a is a flat surface inclined from the first central top surface 118a in a tapered manner toward the root of the first rib 116a, and toward the farthest end of the first rib 116a in the direction in which the first rib 116a extends.

The first central sidewall 122 may extend in the separator thickness direction. Stated otherwise, the first rib body 118 has a rectangular shape in lateral cross section. The first central top surface 118a may be a curved surface (R surface) protruding toward the opposite side second metal separator 38.

In FIG. 6, the length L1 of the first retracted surface 120a in the direction in which the first rib 116a extends (direction indicated by the arrow B) is smaller than the length L2 of the first central top surface 118a in the direction indicated by the arrow B. Preferably, for example, the proportion of the length L1 of the first retracted surface 120a to the length L3 of the top surface of the first rib 116a in the direction indicated by the arrow B is determined to be in the range of 0.05<(L1/L3)<0.3. It should be noted that the value of (L1/L3) can be changed as necessary.

The protruding height of each of the first retracted portions 120 is smaller than the protruding height of the first rib body 118. Further, the protruding height of each of the first retracted portions 120 is smaller than the protruding height of the first seal 62 (first metal bead 64).

Preferably, the inclination angle θ1 of each of the first retracted surfaces 120a to the first central top surface 118a is determined to be not less than 5° and less than 90° (5≤θ1<90°), and more preferably, is determined to be not less than 20° and not more than 45° (20≤θ1≤45°). In FIG. 5A, each of the first retracted portions 120 is spaced from the first seal 62. The front end (end in the direction indicated by the arrow B) of each of the first retracted portions 120 faces a first recessed curved portion 70 of the first seal 62 (first metal bead 64).

As shown in FIGS. 2, 3, and 5A, the first rib 116b is positioned between the first seal 62 and the load receiver 94b. Stated otherwise, the first rib 116b is provided on the support portion 92b. The first rib 116b is spaced from each of the first seal 62 and the load receiver 94b. The first rib 116b has the same structure as the first rib 116a as described above. Therefore, the description regrading structure of the first rib 116b is omitted.

As shown in FIGS. 3, 4, and 5B, second ribs 130a, 130b protrude from, and are formed integrally with the surface 38b of the second metal separator 38. The second ribs 130a, 130b protrude toward the first metal separator 36 (first rib 116a, 116b) positioned on the side opposite to the second metal separator 38 through the MEA 48. That is, the second ribs 130a, 130b protrude in the direction in which the second metal bead 82 extends.

The second rib 130a is positioned on the outer peripheral side of the second seal 80, and faces the first rib 116a. The second rib 130a extends straight in the direction in which the second seal 80 extends in the direction (indicated by the arrow B) in which the second seal 80 extends. It should be noted that the second rib 130a may extend in a wavy pattern. The second rib 130a extends in the direction indicated by the arrow B by the length which is substantially the same length as the first rib 116a.

As shown in FIGS. 4 and 5B, the second rib 130a includes a second rib body 132 positioned at a central position in a direction in which the second rib 132a extends, and two second retracted portions 134 positioned at both ends of the second rib 130a. The second rib body 132 has a trapezoidal shape in lateral cross section tapered (narrowed) toward the front end in a direction in which the second rib 130a protrudes.

That is, the second rib body 132 includes a second central sidewalls 136 provided at both ends inclined from the separator thickness direction, and a second central top portion 138 connecting the protruding ends of the second central sidewalls 136. Each of the second central sidewalls 136 is inclined in a direction getting closer to each other toward the first rib 116a (first rib body 118). The top surface of the second rib body 132 (second central top surface 132a) is a flat surface. In the state where the tightening load is applied to the fuel cell stack 10, the second central top surface 132a contacts the first central top surface 118a of the first rib 116a.

As shown in FIGS. 5B and 6, the two second retracted portions 134 are coupled to both ends of the second rib body 132. Each of the second retracted portions 134 includes a second end sidewall 140 connecting ends of the second central sidewalls 136 on both sides in the direction indicated by the arrow B together, and second side top portions 142 coupling the second central top portion 138 and the second end sidewall 140 together. The second central top portion 138 and the second side top portions 142 are smoothly connected together.

The second end sidewalls 140 are formed to protrude in a circular arc shape outward in the direction in which the second rib 130a extends. In FIG. 6, the top surface (second retracted surface 134a) of each of the second retracted portions 134 is inclined toward the root of the second rib 130a, and toward the farthest end of the second rib 130a in the direction in which the second rib 130a extends. Specifically, each of the second retracted surfaces 134a is a flat surface inclined from the second central top surface 132a in a tapered manner toward the root of the second rib 130a, and toward the farthest end of the second rib 130a in the direction in which the second rib 130a extends.

The second central sidewall 136 may extend in parallel to the separator thickness direction. Stated otherwise, the second rib body 132 has a rectangular shape in lateral cross section. The second central top surface 132a may be a curved surface (R surface) protruding toward the first rib 116a.

The length L4 of the second retracted surface 134a in the direction in which the second rib 130a extends (direction indicated by the arrow B) is smaller than the length L5 of the second central top surface 132a in the direction indicated by the arrow B. Preferably, the ratio of the length L4 of the second retracted surface 134a to the length L6 of the top surface of the second rib 130a in the direction indicated by the arrow B is set to be within the range of 0.05<(L4/L6) <0.3. It should be noted the value of (L4/L6) can be changed as necessary.

The protruding height of each of the second retracted portions 134 is smaller than the protruding height of the second rib body 132. Further, the protruding height of each of the second retracted portions 134 is smaller than the protruding height of the second seal 80 (second metal bead 82).

Preferably, the inclination angle $\theta 2$ of each of the second retracted surfaces 134a from the second central top surface 132a is set to be in the range of $5° \leq \theta 2 < 90°$, and more preferably, set to be in the range of $20° \leq \theta 2 \leq 45°$. In FIG. 5B, each of the second retracted portions 134 is spaced from the second seal 80. The front end (end in the direction indicated by the arrow B) of each of the second retracted portions 134 faces the second recessed curved portion 88 of the second seal 80 (second metal bead 82). In the state where the tightening load is applied to the fuel cell stack 10, the second retracted surface 134a does not contact the first retracted surface 120a of the first rib 116a.

The second rib 130b is positioned on the outer peripheral side of the second seal 80, and faces the first rib 116b. The second rib 130b has the same structure as the above described second rib 130a. Therefore, description regarding the structure of the second rib 130b is omitted. Next, operation of the fuel cell stack 10 having the above structure will be described.

Firstly, as shown in FIG. 1, the oxygen-containing gas is supplied to the oxygen-containing gas supply passage 42a of the end plate 20a. The fuel gas is supplied to the fuel gas supply passage 46a of the end plate 20a. The coolant is supplied to the coolant supply passage 44a of the end plate 20a.

As shown in FIG. 3, the oxygen-containing gas flows from the oxygen-containing gas supply passage 42a into the oxygen-containing gas flow field 58 of the first metal separator 36. The oxygen-containing gas flows along the oxygen-containing gas flow field 58 in the direction indicated by the arrow B, and the oxygen-containing gas is supplied to the cathode 54 of the MEA 48.

In the meanwhile, the fuel gas flows from the fuel gas supply passage 46a into the fuel gas flow field 74 of the second metal separator 38. The fuel gas moves along the fuel gas flow field 74 in the direction indicated by the arrow B, and the fuel gas is supplied to the anode 56 of the MEA 48.

Thus, in each of the MEAs 48, the oxygen-containing gas supplied to the cathode 54 and the fuel gas supplied to the anode 56 are consumed in electrochemical reactions to generate electricity.

Then, the oxygen-containing gas supplied to, and consumed at the cathode 54 is charged along the oxygen-containing gas discharge passage 42b in the direction indicated by the arrow A. Likewise, the fuel gas supplied to the anode 56, and consumed at the anode 56 is discharged along the fuel gas discharge passage 46b in the direction indicated by the arrow A.

Further, the coolant supplied to the coolant supply passage 44a flows into the coolant flow field 91 formed between the first metal separator 36 and the second metal separator 38, and flows in the direction indicated by the arrow B. After the coolant cools the MEA 48, the coolant is discharged from the coolant discharge passage 44b.

In the embodiment of the present invention, when the impact load from the outside is applied to the fuel cell stack 10 in the stacking direction indicated by the arrow B, the load receiver 94a contacts the wall surface of the recess 100a of the coupling member 24a, and the load receiver 94b contacts the wall surface of the recess 100b of the coupling member 24b. In this manner, it is possible to suppress positional displacement of the power generation cells 12 in the direction indicated by the arrow B.

The fuel cell separator member 11 and the fuel cell stack 10 according to the embodiment offer the following advantages.

In the fuel cell separator member 11, the first metal bead 64 and the first ribs 116a, 116b are formed integrally with and protruded from the surface 36a of the first metal separator 36. The first ribs 116a, 116b extend in a line pattern along the first metal bead 64 between the load receivers 94a, 94b and the first metal bead 64.

The first ribs 116a, 116b include the first rib body 118 positioned at the central portion of the first ribs 116a, 116b in the direction in which the first ribs 116a, 116b extend, and the two first retracted portions 120 positioned at both ends of the first ribs 116a, 116b in the direction in which the first ribs 116a, 116b extend. The protruding height of each of the two first retracted portions 120 is smaller than the protruding height of the first rib body 118.

In the structure, the first ribs 116a, 116b are formed to protrude from a position between the load receivers 94a, 94b and the first metal bead 64. Therefore, improvement in the rigidity of the portion of the first metal separator 36 supporting the load receivers 94a, 94b is achieved.

Further, the protruding height of each of the retracted portion 120 is smaller than the protruding height of the first rib body 118. Therefore, when the fuel cell separator member 11 is incorporated into the fuel cell stack 10, and the tightening load is applied to the fuel cell stack 10 in the stacking direction, it is possible to reduce the tightening load applied to both ends of the first rib 116a, 116b, (or it is possible to prevent the tightening load from being applied to both ends of the first ribs 116a, 116b). Thus, it is possible to suppress decrease of the surface pressure applied to the portions of the first metal bead 64 adjacent to the ends of the first ribs 116a, 116b in the direction in which the first ribs 116a, 116b extend. Accordingly, it is possible to reduce variation of the surface pressure applied to the first metal bead 64 of the first metal separator 36.

The first retracted surface 120a of each of the first retracted portions 120 is inclined toward the farthest end of the first ribs 116a, 116b in which the first ribs 116a, 116b extend, and toward the root of the first ribs 116a, 116b.

In the structure, it is possible to reduce the protruding height of the first retracted portion 120 in comparison with the protruding height of the first rib body 118.

The first metal bead 64 extends in a wavy pattern as viewed in the separator thickness direction, and each of the first retracted portions 120 faces the first recessed curved portion 70 of the first metal bead 64 recessed away from the outer marginal portion of the first metal separator 36.

In the structure, it is possible to comparatively increase the distance between the first metal bead 64 and the first retracted portion 120. Accordingly, it is possible to suppress decrease in the surface pressure applied to the portion of the first metal bead 64 adjacent to the ends of the first metal bead 64 in the direction in which the first ribs 116a, 116b extend.

The first ribs 116a, 116b extend straight over the entire length.

In the structure, it is possible to simplify the structure of the fuel cell separator member 11.

The protruding height of each of the first retracted portions 120 is smaller than the protruding height of the first metal bead 64.

In the structure, it is possible to effectively suppress decrease of the surface pressure applied to the portion of the first metal bead 64 adjacent to the ends of the first ribs 116a, 116b in which the first ribs 116a, 116b extend.

The length L1 of each of the first retracted surfaces 120a in the direction in which the first ribs 116a, 116b extend is smaller than the length L2 of the first central top surface 118a in which the first ribs 116a, 116b extend.

In the structure, it is possible to reduce variation of the surface pressure applied to the first metal bead 64 while effectively increasing the rigidity of the support portions 92a, 92b.

The present invention is not limited to the above described embodiment. Various modifications may be made without departing from the gist of the present invention.

The above embodiment can be summarized as follows:

The above embodiment discloses the fuel cell separator member (11). The fuel cell separator member includes the metal separator (36) forming the power generation cell (12) of the fuel cell stack (10), and the load receiver (94a, 94b) provided for the metal separator in a manner that the load receiver protrudes outward from the outer peripheral portion of the metal separator. The metal bead (64) and the rib (116a, 116b) are formed integrally with and protruded from one surface (36a) of the metal separator. The metal bead extends along the outer peripheral portion of the metal separator and is configured to prevent leakage of the reactant gas through a position between the membrane electrode assembly (48) and the metal separator. The rib (116a, 116b) extends in a line pattern along the metal bead between the load receiver and the metal bead. The rib includes the rib body (118) positioned at the central portion of the rib in a direction in which the rib extends, and the two retracted portions (120) positioned at both ends of the rib in the direction in which the rib extends, and the protruding height of each of the two retracted portions is smaller than the protruding height of the rib body.

In the fuel cell separator member, each of protruding end surfaces (120a) of the two retracted portions may be inclined toward the farthest end of the rib in the direction in which the rib extends, and toward the root of the rib.

In the fuel cell separator member, the metal bead may extend in a wavy pattern as viewed in the separator thickness direction, and each of the two retracted portions may face a recessed curved portion (70) of the metal bead recessed away from an outer marginal portion of the metal separator.

In the fuel cell separator member, the rib may extend straight over the entire length of the rib.

In the fuel cell separator member, the protruding height of each of the two retracted portions may be smaller than the protruding height of the metal bead.

In the fuel cell separator member, the length of the protruding end surface of each of the two retracted portions extending in the direction in which the rib extends may be smaller than the length of the protruding end surface (118a) of the rib body in the direction in which the rib extends.

In the fuel cell separator member, the rib may be spaced from each of the load receiver and the metal bead.

In the fuel cell separator member, each of the two protruding end surfaces of the two retracted portions may be a flat surface.

In the fuel cell separator member, the width of the rib may be constant over the entire length of the rib.

The above embodiment discloses the fuel cell stack including the power generation cells. Each of the power generation cells includes the fuel cell separator member, and the load in the stacking direction of the power generation cells is applied to the fuel cell stack in a state where a plurality of the power generation cells are stacked together.

What is claimed is:

1. A fuel cell separator member comprising:
a metal separator forming a power generation cell of a fuel cell stack, and a load receiver provided for the metal separator in a manner that the load receiver protrudes outward from an outer peripheral portion of the metal separator,
wherein a metal bead and a rib are formed integrally with and protruded from one surface of the metal separator, the metal bead extending along the outer peripheral portion of the metal separator and being configured to prevent leakage of a reactant gas through a position between a membrane electrode assembly and the metal separator, and the rib extending in a line pattern along the metal bead between the load receiver and the metal bead;

the rib includes;

a rib body positioned at a central portion of the rib in a direction in which the rib extends; and two retracted portions positioned at both ends of the rib in the direction in which the rib extends, and a protruding height of each of the two retracted portions is smaller than a protruding height of the rib body.

2. The fuel cell separator member according to claim 1, wherein each of protruding end surfaces of the two retracted portions is inclined toward a farthest end of the rib in the direction in which the rib extends, and toward a root of the rib.

3. The fuel cell separator member according to claim 1, wherein the metal bead extends in a wavy pattern as viewed in a separator thickness direction; and each of the two retracted portions faces a recessed curved portion of the metal bead recessed away from an outer marginal portion of the metal separator.

4. The fuel cell stack according to claim 3, wherein the rib extends straight over an entire length of the rib.

5. The fuel cell separator member according to claim 1, wherein the protruding height of each of the two retracted portions is smaller than a protruding height of the metal bead.

6. The fuel cell separator according to claim 1, wherein a length of the protruding end surface of each of the two retracted portions extending in the direction in which the rib extends is smaller than a length of the protruding end surface of the rib body in the direction in which the rib extends.

7. The fuel cell separator member according to claim 1, wherein the rib is spaced from each of the load receiver and the metal bead.

8. The fuel cell separator member according to claim 1, wherein each of the two protruding end surfaces of the two retracted portions is a flat surface.

9. The fuel cell separator member according to claim 1, wherein a width of the rib is constant over an entire length of the rib.

10. A fuel cell stack comprising power generation cells each including a fuel cell separator member, a load in a stacking direction of the power generation cells being applied to the fuel cell stack in a state where a plurality of the power generation cells are stacked together, wherein the fuel cell separator member comprises:

a metal separator forming the power generation cell; and a load receiver provided for the metal separator in a manner that the load receiver protrudes outward from an outer peripheral portion of the metal separator, a metal bead and a rib are formed integrally with and protruded from one surface of the metal separator, the metal bead extending along the outer peripheral portion of the metal separator and being configured to prevent leakage of a reactant gas through a position between a membrane electrode assembly and the metal separator, the rib extending in a line pattern along the metal bead between the load receiver and the metal bead;

the rib includes;

a rib body positioned at a central portion of the rib in a direction in which the rib extends; and two retracted portions positioned at both ends of the rib in the direction in which the rib extends, and the protruding height of each of the two retracted portions is smaller than a protruding height of the rib body.

11. The fuel cell stack according to claim 10, wherein each of protruding end surfaces of the two retracted portions is inclined toward a farthest end of the rib in the direction in which the rib extends, and toward a root of the rib.

12. The fuel cell stack according to claim 10, wherein the metal bead extends in a wavy pattern as viewed in a separator thickness direction; and each of the two retracted portions faces a recessed curved portion of the metal bead recessed away from an outer marginal portion of the metal separator.

13. The fuel cell stack according to claim 12, wherein the rib extends straight over an entire length of the rib.

14. The fuel cell stack according to claim 10, wherein the protruding height of each of the two retracted portions is smaller than a protruding height of the metal bead.

15. The fuel cell stack according to claim 10, wherein a length of the protruding end surface of the two retracted portions extending in the direction in which the rib extends is smaller than a length of the protruding end surface of the rib body in the direction in which the rib extends.

16. The fuel cell stack according to claim 10, wherein the rib is spaced from each of the load receiver and the metal bead.

17. The fuel cell stack according to claim 10, wherein each of the two protruding end surfaces of the two retracted portions is a flat surface.

18. The fuel cell stack according to claim 10, wherein a width of the rib is constant over an entire length of the rib.

* * * * *